(12) United States Patent
Jauregui Misas et al.

(10) Patent No.: US 9,065,245 B2
(45) Date of Patent: Jun. 23, 2015

(54) STRUCTURED DOUBLE-SHEATH FIBER

(75) Inventors: César Jauregui Misas, Jena (DE); Fabian Stutzki, Jena (DE); Jens Limpert, Jena (DE); Florian Jansen, Jena (DE); Andreas Tuennermann, Weimar (DE)

(73) Assignees: Fraunhofer-Gesellschaft zur Foerderung der angewandten Forschung e.V., Munich (DE); Friedrich-Schiller-Universitaet Jena, Jena (DE)

( * ) Notice: Subject to any disclaimer, the term of this patent is extended or adjusted under 35 U.S.C. 154(b) by 0 days.

(21) Appl. No.: 13/988,771

(22) PCT Filed: Nov. 22, 2011

(86) PCT No.: PCT/EP2011/005880
§ 371 (c)(1),
(2), (4) Date: Jul. 30, 2013

(87) PCT Pub. No.: WO2012/069180
PCT Pub. Date: May 31, 2012

(65) Prior Publication Data
US 2014/0010246 A1    Jan. 9, 2014

(30) Foreign Application Priority Data
Nov. 23, 2010    (EP) .................................... 10192190

(51) Int. Cl.
*H01S 3/30*    (2006.01)
*H01S 3/094*    (2006.01)
(Continued)

(52) U.S. Cl.
CPC ....... *H01S 3/094003* (2013.01); *G02B 6/02009* (2013.01); *G02B 6/02333* (2013.01); *G02B 6/02338* (2013.01); *G02B 6/0288* (2013.01); *G02B 6/03622* (2013.01)

(58) Field of Classification Search
CPC . H01S 3/067; H01S 3/06708; H01S 3/06716; H01S 3/06733; H01S 3/08068; H01S 3/091; H01S 3/093
USPC ................................ 372/6, 26–27, 29.023, 30
See application file for complete search history.

(56) References Cited

U.S. PATENT DOCUMENTS 5,818,630 A    10/1998    Fermann et al.
7,142,757 B1    11/2006    Ward
(Continued)

FOREIGN PATENT DOCUMENTS

EP    1 241 491 A1    9/2002
EP    1241491    *    9/2002
(Continued)

OTHER PUBLICATIONS

International Search Report of PCT/EP2011/005880, mailed Aug. 14, 2012.
(Continued)

*Primary Examiner* — Dung Nguyen
(74) *Attorney, Agent, or Firm* — Collard & Roe, P.C.

(57) ABSTRACT

The invention relates to a double-sheath fiber having a core region (1) and a sheath region, the sheath region having an inner region (2) and an outer region (3), which comprises a refractive index that is lower with respect to that of the inner region (2) and the core region (1), wherein the outer region (3) surrounds the inner region (2). The invention proposes an internal structure (4) of the inner region (2) which effects a spatial overlap of modes of higher order with the core region (1), which is lower than the spatial overlap of a fundamental mode with the core region (1).

8 Claims, 4 Drawing Sheets

Figure 1:
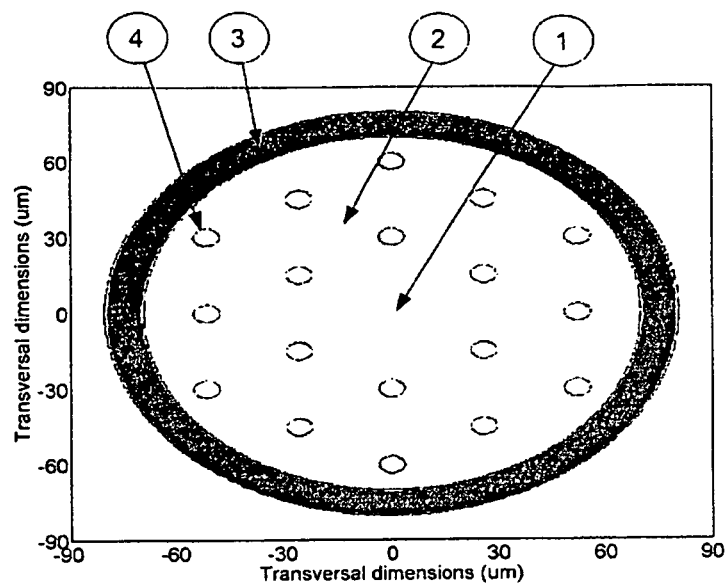

(51) Int. Cl.
*G02B 6/02* (2006.01)
*G02B 6/028* (2006.01)
*G02B 6/036* (2006.01)

(56) References Cited

U.S. PATENT DOCUMENTS

| | | |
|---|---|---|
| 7,171,091 B1 | 1/2007 | Ward |
| 7,787,729 B2 | 8/2010 | Dong et al. |
| 2002/0164136 A1 | 11/2002 | Fukuda et al. |
| 2008/0199135 A1 | 8/2008 | Proulx |

FOREIGN PATENT DOCUMENTS

| | | |
|---|---|---|
| WO | WO 01/31376 A1 | 5/2001 |
| WO | WO 2005/109056 A1 | 11/2005 |
| WO | WO 2006/082348 A9 | 10/2006 |
| WO | WO 2011/160646 A1 | 12/2011 |

OTHER PUBLICATIONS

Poli, F. et al., "Single-Mode Regime in Large-Mode-Area Rare-Earth-Doped Rod-Type PCFs," IEEE J of Sel Top in Quantum Electronics, Jan. 1, 2009, V.15, No. 1, pp. 54-60, XP011280683.

Hildebrandt et al., "Single-frequency master-oscillator photonic crystal fiber amplifier with 148 W output power," Optics Exp, V.14, N. 23, Oct. 30, 2006, pp. 11071-11076, XP002671066.

\* cited by examiner

STRUCTURED DOUBLE-SHEATH FIBER

CROSS REFERENCE TO RELATED APPLICATIONS

This application is the National Stage of PCT/EP2011/005880 filed on Nov. 22, 2011, which claims priority under 35 U.S.C. §119 of European Application No. 10192190.6 filed on Nov. 23, 2010, the disclosures of which are incorporated by reference. The international application under PCT article 21(2) was not published in English.

The invention relates to a double-sheath fiber having a core region and a sheath region, the sheath region having an inner region and an outer region, which comprises a refractive index that is lower with respect to that of the inner region and the core region, wherein the outer region surrounds the inner region.

Double-sheath fibers of this type are utilized in laser systems, more particularly in fiber laser systems. Here, the pump light with a low beam quality can be coupled into the sheath region and/or core region of a fiber whereas the signal light with a noticeably higher beam quality predominantly propagates within the core region.

The quality of any fiber laser system crucially depends on the fiber applied. Thus, continuous advances in the development of applied fibers are striven for in order to eliminate currently existing limitations of prior art fiber laser systems. By introducing the double-sheath technology it became possible for the first time ever to exploit the high performance of pump diodes of a low brilliance (beam quality). Meanwhile, commercially available cw laser systems achieve output performance rates of 10 kW.

Owing to the possibility of amplifying both the pump light and the signal light via large fiber lengths, active optical fibers can reach very high efficiencies. Moreover, they feature excellent thermal properties and emit diffraction-limited radiation of high quality regardless of the output performance rate.

A propagation of a high-intensity signal light in a relatively small fiber core over longer distances may entail problems due to non-linear effects that may substantially affect the quality of the output beam. Some of these non-linear effects are the self-phase modulation (SPM), Raman scattering, Brillouin scattering, and four-waves mixing (FWM). These non-linear effects impede a further increase in output performance rate substantially.

To avoid occurrence of non-linear effects, different strategies known from prior art have therefore been developed. Surely the most effective method is enhancing the core diameter. Hereby, the light intensity is reduced via the fiber cross-section which immediately counteracts an occurrence of non-linear effects. Moreover, an enhanced core diameter has a benefit in that more active ions can be launched, thus increasing the energy stored in the fiber. Hereby, the length of the necessary absorption path within the fiber can be reduced which in turn results in a shorter fiber. A problematic issue with this approach, however, is that a plurality of modes can propagate within the fiber core. This reduces the beam quality of the laser system. At the same time, laser instabilities might occur which substantially influence the operating properties of the laser. Therefore, when enhancing the core diameter, it is always necessary to ensure single-mode operation within the fiber.

Known from prior art in technology are so-called large-mode-area fibers (LMA) having core diameters greater than 10 µm while rendering excellent beam quality. LMA fibers can be realized as step-index fibers, wherein the numerical aperture (NA) is technically limited to a value of roughly 0.06. This corresponds to a maximal single-mode core diameter of approximately 13 µm. LMA step-index fibers with greater core diameters thus basically lead to more modes (multiple-mode operation). A single-mode operation can be achieved by a selective excitation of the fundamental mode of a multiple-mode fiber. This approach is disclosed, for example, in printed publication U.S. Pat. No. 5,818,630 C1. A problematic issue with this approach is that the signal light needs to be coupled very carefully into the fiber in order to excite the fundamental mode only. In practice, however, this is very costly and can be fulfilled only with great difficulties at high performance rates.

Another prior art approach provides for employing photonic crystal fibers (PCF). These fibers are comprised of an actively doped fiber core and a sheath composed of air channels periodically arranged around this core. Such a fiber design is disclosed, for example, in WO 2006/082348 A9. Provided the air channels are sufficiently narrow and extend at a large radial distance to the fiber core, a guidance based on the effective refractive index difference may be assumed. These fibers have an advantage in that the channel diameter d and the center distance Λ of two channels influence the numerical aperture of the fiber. Hereby the numerical aperture can be reduced to very low values of roughly 0.01. In prior art, mode field diameters of well over 50 µm have been achieved which allow for an effectively single-mode operation. However, since the photonic crystal fibers do not have a clear-cut limitation between the core and the sheath, they constantly work in multiple-mode operation. This in turn entails those well-known problems of mode instabilities and performance rate fluctuations with high output rates. Effectively these fibers are thereby limited to a mode field diameter of roughly 80 µm.

The printed publication U.S. Pat. No. 7,787,729 B2 discloses so-called leakage channel fibers in which the air channels within the fibers function like a mode screen in which the modes of a higher order owing to their lesser structure size may penetrate into the sheath and experience increased propagation losses, whereas the fundamental mode remains within the fiber core. This enables an effective single-mode operation. But since this concept is based on an energy loss from the core in a sheath of infinite extension, it is merely applicable to passive or core-pumped single-sheath fibers.

Now, therefore, against this background, it is an object of the present invention to provide a double-sheath fiber of the initially specified type which effectively works in single-mode operation and which by its scalability avoids a creation of non-linear effects even with high intensities of the conducted laser light.

The present invention achieves this object by providing for an inner structure of the inner region which effects a spatial overlap of modes of higher order with the core region that is smaller than the spatial overlap of a fundamental mode with the core region. This effect may be designated as delocalization of modes. Thus, it is primarily the fundamental mode that is conducted within the core region.

The inventive double-sheath fiber basically works in multiple-mode operation, because it comprises a double-sheath structure and in contrast with a leakage-channel fiber it causes no different propagation losses for different modes. The effectively single-mode operation in an active laser system can be substantiated by two characteristic properties. It is already during the coupling-in of the signal beam that the excitation of modes of a higher order is made more difficult due to their delocalization. Contrary to prior art in technology, it needs no selective coupling-in and adjustment for exciting the fundamental mode only. In addition, in active fibers, a reduced overlap of higher-order modes with the doped core region leads to a substantially lower amplification versus the fundamental mode conducted in the core region.

In accordance with the present invention, a delocalization of higher-order modes may not only be related to the axial fiber core but also to other regions of the fiber. These picked-out regions which also may comprise a smaller overlap with the modes of higher order are also regarded as core regions within the sense of the present invention.

The inventive structured double-sheath fiber typically supports several hundreds of modes. In a double-sheath fiber, basically all modes propagate without suffering losses worth mentioning, because in a theoretically ideal case a mode coupling cannot occur. Since there is no firm borderline between the core region and the sheath region, the modes of both regions cannot be separated from each other clearly. As a result, the modes of the core region, too, directly are modes of the entire fiber, however the greatest part of their energy being concentrated in the core region of the fiber. In contrast with step-index fibers, the fundamental mode within the structured double-sheath fiber not always has the highest effective refractive index. The effective refractive indices of core modes of a higher order, too, may be mixed with the sheath modes. Hence, terms like "modes of the core region" and "modes of the sheath region" need to be defined based on localization, because these predominantly propagate within the core region and/or sheath region. This mixing of the effective indices of core and sheath modes may lead to an avoided crossing between modes and can thus be utilized for a strong deformation and delocalization, respectively.

In accordance with the present invention, the double-sheath fiber can be doped with rear-earth ions at least partly, more particularly in the core region. Likewise, it may be so configured that it is polarization-conserving or that it modifies polarization selectively. Doping with appropriate elements moreover allows for making an index adjustment and/or maladjustment of the fiber regions which in turn may entail increased delocalization. Furthermore, the fiber may be configured to be mechanically stiff or especially flexible for special applications.

In the purview of the present invention, the core region may be separated by one refractive index step from the other regions of the fiber. Alternatively, the core region may also be defined by an index gradient.

In a preferred embodiment of the present invention, the inner structure is formed by channels mainly extending in fiber length direction. The described properties of the inventive delocalization may predominantly be accentuated in hexagonal structures of the channels, if the distance between the two channels preferably is more than 20 times the wavelength of the propagating light. Furthermore, it is recommendable that the ratio of the diameter d of the channels versus the center distance $\Lambda$ of adjacent channels is smaller than 0.5, preferably smaller than 0.3. It is of particular advantage to form the core region of the structured double-sheath fiber by the omission of at least one channel. In terms of manufacturing technique, this variant is particularly easy to produce. This embodiment in which the diameters of the channels are relatively small as compared with the distance of the channels in practice has proved to be especially advantageous.

Furthermore of particular suitability is an embodiment in which the channels are arranged in groups comprised of two channels or more. The center distance of adjacent channels of the same group is smaller than the center distance of two channels belonging to different groups. The distance of the centers of two adjacent groups should also be greater than 20 times the wavelength of the light propagating in the fiber.

As has already been mentioned before, the channels may be arranged hexagonally in the cross-section of the fiber. This relates to both the arrangement of the overall structure of all channels and to the arrangement of the channels within smaller groups.

Another embodiment provides for the channels to extend spirally from the core region in outward direction. The spiral geometry can also be transferred into a hexagonal structure by utilizing channels sized in different dimensions. Even other variants are conceivable, for example shapes which have only one symmetry class each, only one symmetrical axis or no symmetrical axis at all.

Likewise the channels within the inner structure may be arranged in two or more arrangements situated radially one behind each other. For example, the arrangement situated further outside in radial direction may be comprised of channels that lie more closely next to each other than the arrangement which is situated more closely to the core region of the fiber. Hereby, the modes guided in the core region can be separated from the modes outside the core region and/or outside the inner structure.

Another conceivable embodiment provides for that the inner structure is surrounded by another region which can be utilized for amplifying the delocalization or for shielding. Amplifying the delocalization in the simplest case can be achieved by a non-structured region that may lead to an interaction of modes in a way that it has an equivalent or higher refractive index than the remaining inner region. A shielding can be achieved, for example, by a lower refractive index of the additional region as compared with the remaining inner region. This advantageous effect is brought about in such a manner that the region with a higher refractive index which comprises the inner structure (e.g. channels) acts as a barrier which effectively divides the fiber into two regions with different refractive indices. An interaction between the modes of different regions is thus prevented. In this manner, it is possible to increase the diameter of the outer structure without this causing the fundamental mode to experience an interaction, for example by an avoided crossing, with other modes, which might lead to a reduced overlap of the fundamental mode with the core region. This additional region of the shielding or amplified delocalization may be evoked by a well-aimed choice of the channel structure, for example additional rings with particularly densely arranged channels or an increased channel size. In this way, it is primarily the outer structure that can cause the delocalization of the modes of higher order from the core region, or support the effect of the inner structure.

Both the outer structure and the inner structure may be segmented in circumferential direction, thus resulting in a structure interruption in circumferential direction. A structure is thus created that corresponds to a ring cut into individual segments. The individual segments may comprise elements which protrude radially outwardly or inwardly from the corner regions of the ring elements. In particular, this makes it possible to realize a fine adjustment for delocalizing the modes of a higher order.

The inventive structured double-sheath fiber is especially suitable for applications in fiber laser systems in which laser light with high intensity is to be conducted and amplified. In this sense, those laser systems utilizing an inventive double-sheath fiber are explicitly deemed to be included in the present invention.

Figure 2:
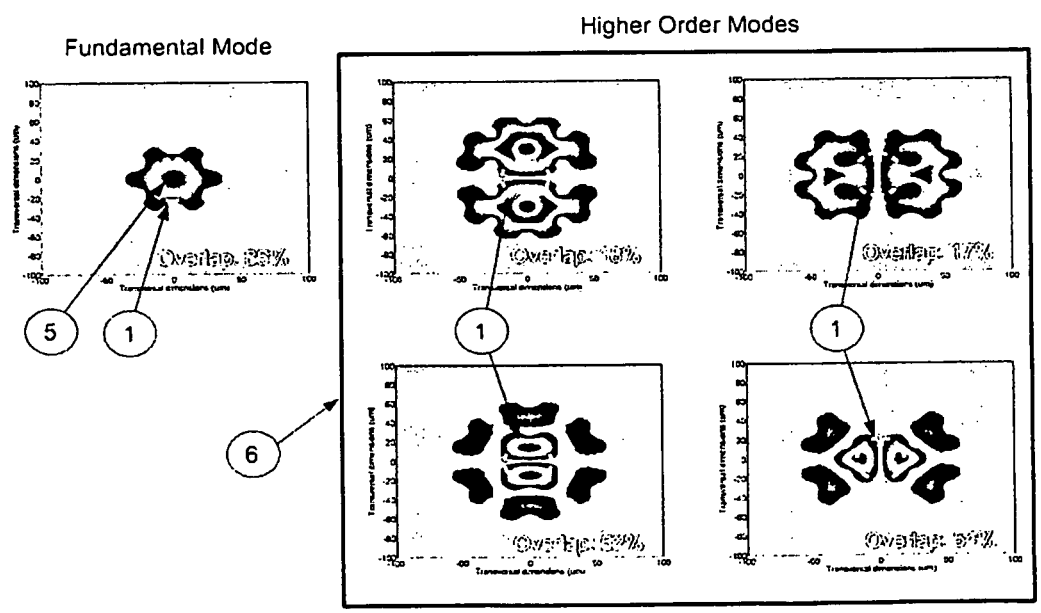
Figure 3:
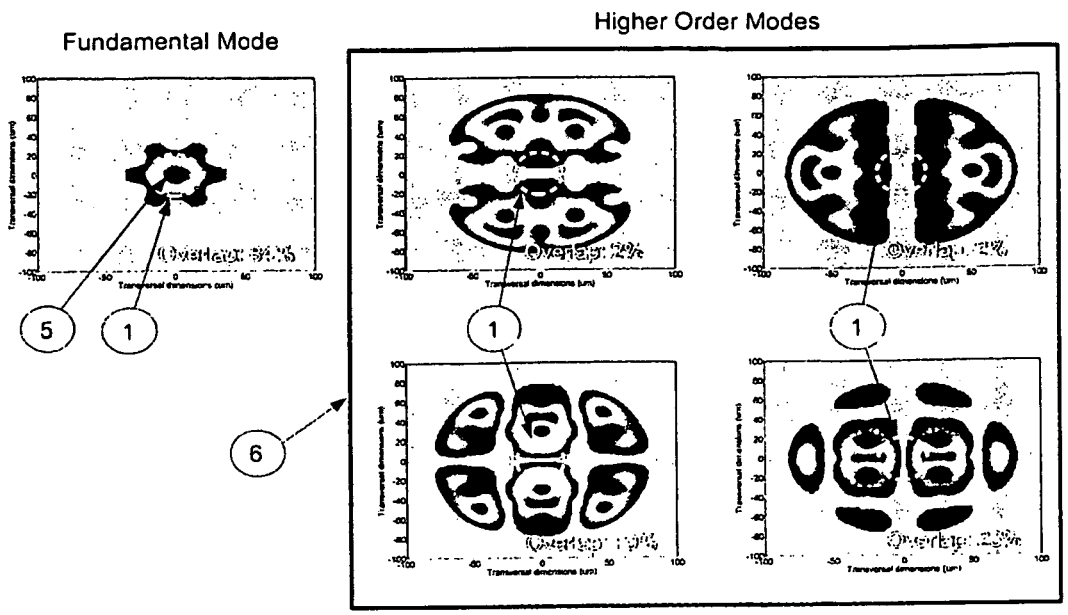
Figure 4:
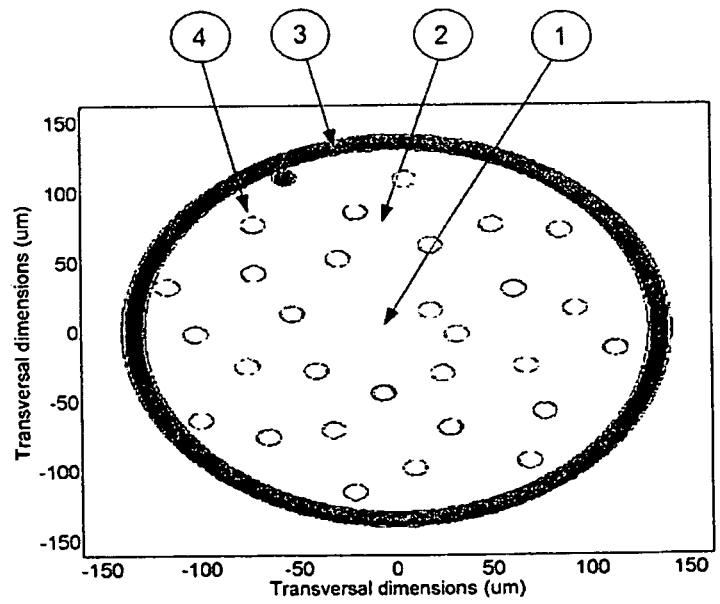
Figure 5:
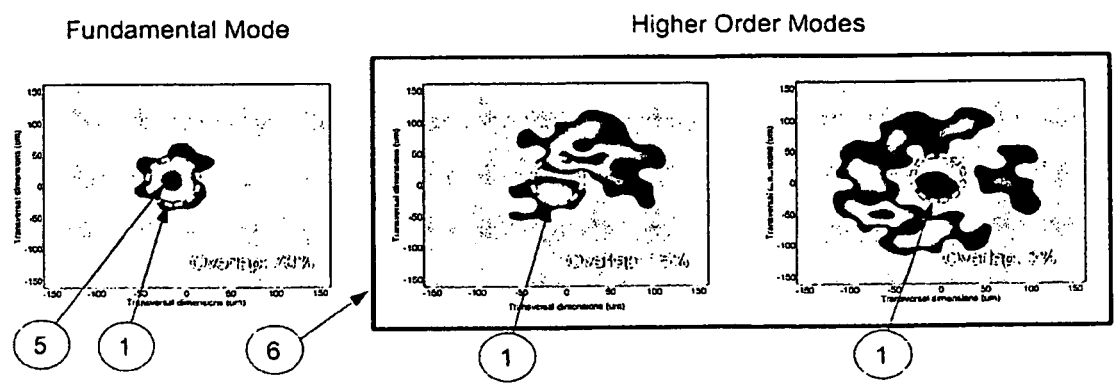
Figure 6:
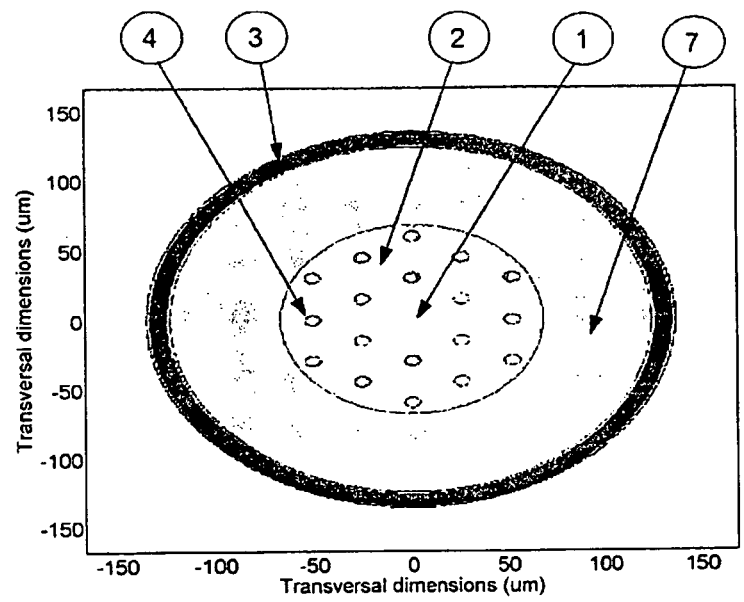
Figure 7:
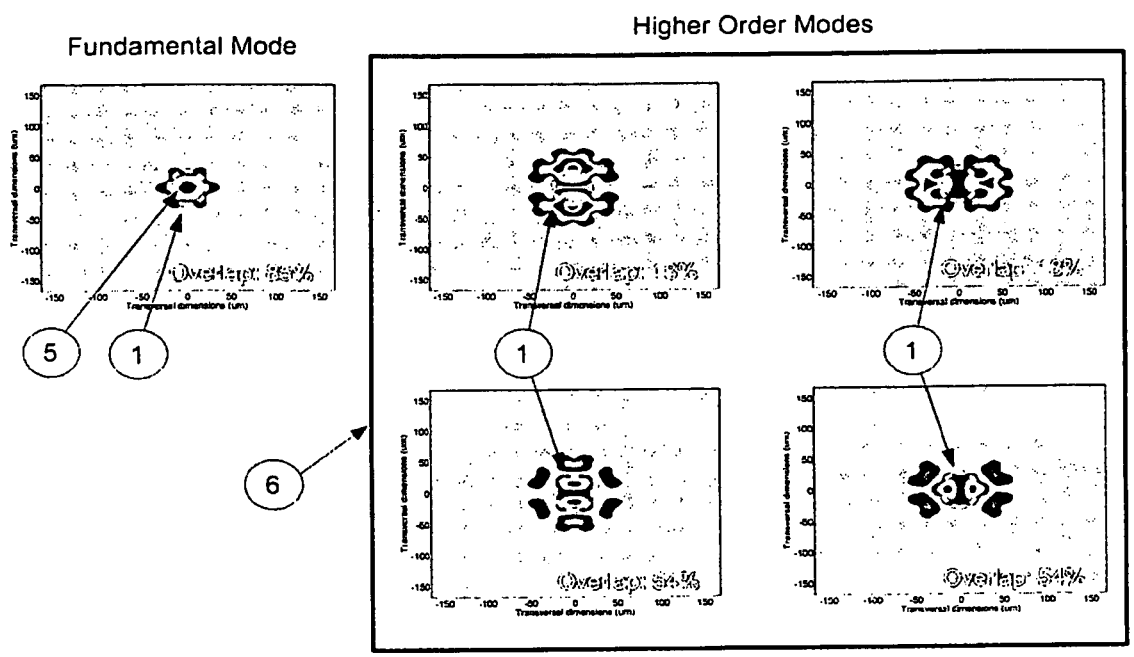

Practical examples of the present invention are elucidated more precisely in the following based on various figures, where:

FIG. 1: is a cross-sectional representation of a first embodiment variant of an inventive double-sheath fiber;

FIG. 2: is a representation of the fundamental mode and four different modes of a higher order within the double-sheath fiber according to FIG. 1;

FIG. 3: depicts representations of the fundamental mode and four different modes of a higher order within the double-sheath fiber according to FIG. 1 with an increased diameter of the outer region;

FIG. 4: shows a second embodiment variant with a spiral-shaped arrangement of four channels;

FIG. 5: depicts representations of the fundamental mode and two modes of a higher order within the double-sheath fiber according to FIG. 4;

FIG. 6: shows a third embodiment variant with an arrangement of the inner structure in a region of the fiber with a refractive index that deviates from the other regions;

FIG. 7: depicts representations of the fundamental mode and four different modes of a higher order within the double-sheath fiber according to FIG. 6.

FIG. 1 shows a double-sheath fiber in a cross-sectional view with a core region 1 and an inner region 2. The inner region comprises an inner structure 4 and is confined by an outer region 3. In this example, the inner structure 2 is formed via channels running in parallel to the fiber axis, said channels having a refractive index that differs from the refractive index of the core region 1.

In principle, a double-sheath fiber may be regarded as a normal step-index fiber having a very large core. The core of this equivalent step-index fiber extends via the complete inner region 2 and core region 1, and it is surrounded by the outer region 3 as a sheath of the step-index fiber. The local distribution of the modes within such a non-structured step-index fiber with a large diameter is nearly homogeneous, whereby each region of the fiber core on average is interspersed with an equal number of modes 5, 6. An inventive delocalization of modes 5, 6 does not occur in such a step-index fiber.

However, if the fiber core is surrounded by an inner structure 4 as shown in FIG. 1, it is possible to delocalize some modes 6 from the core region 1 and to concentrate other modes 5 (fundamental modes) within the core region 1. The hexagonal arrangement of channels 4 within the double-sheath fiber is so designed that the modes of a higher order 6 are delocalized from the core region 1 whereas only the desired fundamental mode 5 remains within the core region 1. This results in a good overlap of the fundamental mode 5 with the core region 1 and at the same time it reduces the overlap of the higher-order modes 6 with the core region 1. In case of a passive fiber, it leads to a less accentuated excitability of higher-order modes 6 within the core region 1. In an active fiber, this configuration additionally comprises a reduced overlap with the doped region and thereby a lesser amplification of the higher-order modes 6. Thus, the double-sheath fiber evidences an effectively single-mode behavior.

In accordance with FIG. 1, the structured double-sheath fiber is comprised of a hexagonal arrangement of air channels 4 having a center distance $\Lambda$ which in relation to the channel diameter d is less than 0.5. In particular, the fiber according to FIG. 1 comprises two concentric rings composed of air channels 4 which have a center distance of 30 μm and a d:$\Lambda$=0.22 ratio. The outer region 3 of the sheath region of the fiber has a diameter of 150 μm.

FIG. 2 shows various modes 5, 6 of the double-sheath fiber according to FIG. 1, which feature a different overlap with the core region 1. Here, the core region 1 is depicted as a dashed circle. As one may see, the Gaussian fundamental mode 5 has the largest overlap with the core region 1, i.e. roughly 85%. Thereby, the greatest part of the energy of the induced beam will propagate in this mode 5. Higher-order modes 6 have an overlap with the core region 1 which in any case is less than 55%. In contrast with an ordinary LMA step-index fiber, the overlap of higher-order modes 6 with a double-sheath fiber is substantially less. In a step-index fiber, the portion of higher-order modes 6 within the core region 1 would not be substantially less than the fundamental mode 5. If the inventive double-sheath fiber is simultaneously doped with rare-earth ions in the core region 1, then the higher-order modes 6 have an accordingly less overlap with the active region of the core region 1. If the modes propagate within the fiber, they are exposed to different amplifying conditions, whereby they have a correspondingly lesser portion of higher-order modes 6 at the exit of the fiber. Though the latter effect plays an important part in active fibers, it does not constitute a necessary prerequisite for the present invention. Since the reduced overlap of the modes of higher order 6 with the core region 1 of the fiber exists independently of a doping, if any, the delocalization of higher-order modes 6 is given directly from the moment at which the pump light enters into the fiber, because the modes of higher order 6 cannot be excited efficiently.

FIG. 3 shows the representations of the fundamental mode 5 as well as of four different modes of higher order 6 within a double-sheath fiber having an increased diameter of the outer region 3. The arrangement of channels 4 within the inner structure 2 is the same as that according to FIG. 2. Merely the diameter of the outer region 3 is enhanced and amounts to 181 μm, for example. By enhancing the diameter of the outer region 3, the effect of the avoided crossing is exploited. This effect predominantly occurs in structured double-sheath fibers and can be regulated by an adequate choice of the diameter of the outer region 3. In the given embodiment example according to FIG. 3, with a diameter of the outer region 3 of 181 μm, it occurs that the effective diffraction indices of two modes of a higher order 6 lie closely side by side. This leads to a reciprocal effect of the two modes 6 with a strong deformation as depicted in FIG. 3. The overlap of the fundamental mode 5 with the core region 1 remains nearly unaltered at approximately 84%, whereas the overlap of the modes of higher order 6 with less than 25% is now substantially smaller than in the first embodiment variant according to FIGS. 1 and 2, respectively.

FIG. 4 depicts a second embodiment variant with a spiral-shaped arrangement of channels 4. This asymmetrical arrangement of air channels 4—or even alternative arrangements with a reduced number of symmetrical axes—also leads to a strong delocalization of the modes of higher order 6 from the core region 1. Though the spiral-shaped arrangement of channels 4 does not comprise any symmetrical axes, but it has sufficient similarity to a symmetrical arrangement so that the guidance of the localized fundamental mode 5 can be warranted.

FIG. 5 shows the overlap of the fundamental mode 5 with the core region 1 in a magnitude of 76%, whereas the overlap of the modes of higher order 6 amounts to less than 15%.

A third embodiment variant according to FIG. 6 shows a double-sheath fiber with a shielding of the inner structure 2. In this embodiment, the shielding has been realized by a deviating refractive index in a region 7. If this refractive index is greater than the refractive index of the surrounding, it is possible to increase the diameter of the outer region 3, without the fundamental mode 5 experiencing an avoided crossing with another mode. The reason is that the region 7 of the higher refractive index which comprises the channels 4 acts like a barrier which divides the fiber into two regions with different effective refractive indices. Thus, even the propagating modes are split into two separate groups with different refractive indices which leads to a prevention of the avoided crossing between modes from different groups. As outlined in FIG. 6, the region 7 of a higher refractive index surrounds the inner structure 2 of channels 4 completely. Therefore, as compared with the arrangement according to FIG. 1, it results no influence on the configuration of the modes or on the overlap with the core region 1. In accordance with FIG. 7, this leads to an overlap of the fundamental mode 5 with the core region 1 of approximately 85%, whereas the modes of higher order 6 feature an overlap of maximally 54%.

As an alternative to FIG. 7, it is likewise conceivable that the region 7 of the higher refractive index which includes the air channels 4 is surrounded by a second arrangement of more densely arranged air channels 4. This leads to an equivalent shielding of the modes according to the representation depicted in FIG. 7. In principle, a shielding of the modes within the inner structure 2 can be realized by any configuration and geometrical shape of the arrangement of the air channels 4.

The invention claimed is:

1. A double-sheath fiber having a core region (1) and a sheath region, the sheath region having an inner region (2) and an outer region (3), which comprises a refractive index that is lower with respect to that of the inner region (2) and the core region (1), wherein the outer region (3) surrounds the inner region (2), comprising an internal structure (4) of the inner region (2) which effects a spatial overlap of modes of higher order with the core region (1), which is lower than the spatial overlap of a fundamental mode with the core region (1), wherein the internal structure (4) is formed by channels mainly extending in fiber length direction, wherein the ratio of the diameter d of the channels versus the center distance $\Lambda$ of adjacent channels is less than 0.5, preferably less than 0.3, with the center distance $\Lambda$ being greater than 20 times a wavelength of an electromagnetic radiation propagating in the fiber.

2. A double-sheath fiber according to claim 1, wherein the fundamental mode comprises a spatial overlap with the core region (1) that is by at least 25% greater than any other modes of an electromagnetic radiation propagating in the double-sheath fiber.

3. A double-sheath fiber according to claim 1, wherein the core region (1) and the inner region (2) are shielded by an additional region (7) outwardly towards the outer region (3).

4. A double-sheath fiber according to claim 1, wherein the internal structure (4) is formed by groups of channels mainly extending in fiber length direction, with the distances of channels within a group being smaller than the center distances between adjacent groups.

5. A double-sheath fiber according to claim 1, wherein the internal structure (4) if viewed in the fiber cross-section has a geometry of little symmetry.

6. A double-sheath fiber according to claim 1, wherein a delocalization of the modes of higher order from the core region (1) is achieved by exploiting an avoided crossing.

7. A double-sheath fiber according to claim 1, wherein the core region (1) is doped with rare earth.

8. A laser system, more particularly a fiber laser system, comprising a double-sheath fiber according to claim 1.

* * * * *